(12) United States Patent
Chung et al.

(10) Patent No.: US 9,517,658 B2
(45) Date of Patent: Dec. 13, 2016

(54) AXLE ASSEMBLY WITH CARRIER HOUSING HAVING INCREASED STRENGTH AND REDUCED MASS

(71) Applicant: American Axle & Manufacturing, Inc., Detroit, MI (US)

(72) Inventors: Chih-Hung Chung, Detroit, MI (US); Dajun Zuo, Detroit, MI (US); Adrian M. Lenczewski, Detroit, MI (US); Robert Chisholm, Detroit, MI (US); Brian Demos, Detroit, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 14/329,010

(22) Filed: Jul. 11, 2014

(65) Prior Publication Data
US 2016/0009136 A1  Jan. 14, 2016

(51) Int. Cl.
*B60B 35/16* (2006.01)
*B60K 23/00* (2006.01)
*F16H 48/42* (2012.01)

(52) U.S. Cl.
CPC ............. *B60B 35/166* (2013.01); *B60K 23/00* (2013.01); *F16H 48/42* (2013.01); *B60B 2900/111* (2013.01); *B60B 2900/311* (2013.01); *F16H 2048/423* (2013.01)

(58) Field of Classification Search
CPC .................................................... B60B 35/166
See application file for complete search history.

(56) References Cited

U.S. PATENT DOCUMENTS

| | | | |
|---|---|---|---|
| 1,950,034 A | | 3/1934 | Mulford et al. |
| 2,478,180 A | * | 8/1949 | Buckendale .................. 74/607 |
| 2,701,972 A | * | 2/1955 | Hoffman ....................... 74/607 |
| 3,041,890 A | | 7/1962 | O'Brien |
| D345,127 S | | 3/1994 | Stenglein et al. |
| 5,486,757 A | | 1/1996 | Easley |
| 5,655,418 A | * | 8/1997 | Barnholt ....................... 74/607 |
| 6,216,658 B1 | | 4/2001 | Pierro et al. |
| 6,796,404 B1 | | 9/2004 | Dick, Jr. et al. |
| 7,229,087 B2 | | 6/2007 | Nicolas |
| D600,167 S | | 9/2009 | Maguire et al. |
| 7,669,330 B1 | | 3/2010 | McGean |
| D631,799 S | | 2/2011 | Maguire et al. |
| 8,036,863 B2 | | 10/2011 | Schankin et al. |
| 8,087,323 B2 | | 1/2012 | Hedman et al. |
| 8,657,316 B1 | | 2/2014 | Bowers et al. |
| 9,074,678 B1 | | 7/2015 | Marsh, Jr. et al. |
| 9,109,689 B2 | | 8/2015 | Khatavkar et al. |
| 2004/0162148 A1 | | 8/2004 | Krugman et al. |

(Continued)

FOREIGN PATENT DOCUMENTS

WO  WO-2009/042314 A1  4/2009

OTHER PUBLICATIONS

SAE Technical Paper Series 2003-01-3427 entitled "Design Optimization Method for CAD Structural Components", dated Nov. 10, 2003.

*Primary Examiner* — Mark Manley
(74) *Attorney, Agent, or Firm* — Harness, Dickey & Pierce, P.L.C.

(57) ABSTRACT

An axle assembly with a Salisbury-type axle housing that includes a carrier housing. The carrier housing is constructed with a system of reinforcements in selected areas.

28 Claims, 12 Drawing Sheets

(56) References Cited

U.S. PATENT DOCUMENTS

2006/0094558 A1* 5/2006 Petruska ............... F16H 57/029
  475/220
2006/0094588 A1  5/2006 Gibson et al.
2008/0305910 A1* 12/2008 Brasile et al. ................ 475/220
2015/0087461 A1  3/2015 Jackson et al.

* cited by examiner

AXLE ASSEMBLY WITH CARRIER HOUSING HAVING INCREASED STRENGTH AND REDUCED MASS

FIELD

The present disclosure relates to an axle assembly with a carrier housing having increased strength and reduced mass.

BACKGROUND

This section provides background information related to the present disclosure which is not necessarily prior art.

Salisbury-type axle housings are well known in the art and comprise a carrier housing and a pair of axle tubes that are fixedly coupled to the carrier housing. The carrier housing is configured to house a differential assembly, an input pinion and a ring gear, and is commonly formed of cast iron or aluminum. The carrier housing is typically designed for use in a given packaging space that is dependent on the particular vehicle that the axle housing will be integrated into. While the known carrier housings are suited for their intended purpose, they nevertheless remain susceptible to improvement.

SUMMARY

This section provides a general summary of the disclosure, and is not a comprehensive disclosure of its full scope or all of its features.

In one form the present teachings provide an axle assembly that includes a carrier housing, an input pinion, a differential mechanism, a ring gear, a cover pan assembly and first and second axle tubes. The carrier housing has a first body portion, a pair of hollow tube mounts, and a second body portion. The first body portion defines a differential mechanism cavity and a cover flange. The cover flange defines a plurality of bolt holes. The tube mount extends from opposite lateral sides of the first body portion and is in fluid communication with the differential mechanism cavity. The second body portion extends from the first body portion on a side of the first body portion that is opposite the cover flange. A pinion bore is formed through the second body portion and intersects the differential mechanism cavity. The input pinion has a stem and a pinion gear. The stem is received in the pinion bore and the pinion gear is disposed in the differential mechanism cavity. The differential mechanism is received in the cavity in the carrier housing. The ring gear is coupled to the differential mechanism. The ring gear is received in the differential mechanism cavity and meshed with the pinion gear. The cover pan assembly is sealingly coupled to the cover flange to close a side of the differential mechanism cavity that is opposite to the second body portion. The cover pan assembly includes a cover pan and a plurality of bolts that are received through the cover pan and threadably engaged to the bolt holes in the cover flange. The first and second axle tubes are received in the first and second axle tube bores and are fixedly coupled to the carrier housing. The carrier housing includes a pair of strengthening ribs that are located on top and bottom sides of the carrier housing. Each of the strengthening ribs has a first rib portion, which extends outwardly from the first body portion and at least partly defines the cover flange, and a pair of second rib portions. Each second rib portion extends from an end of the first rib portion and extends laterally outwardly and forwardly toward the second body portion. Each second rib portion terminating at an associated one of the tube mounts.

In another form, the present teachings provide an axle assembly having a carrier housing, an input pinion, a head bearing, a tail bearing, a differential mechanism, a ring gear, a cover pan assembly and first and second axle tubes. The carrier housing has a first body portion, a pair of hollow tube mounts, and a second body portion. The first body portion defines a differential mechanism cavity and a cover flange. The tube mounts extend from opposite lateral sides of the first body portion and are in fluid communication with the differential mechanism cavity. The second body portion extends from the first body portion on a side of the first body portion that is opposite the cover flange. A pinion bore is formed through the second body portion and intersects the differential mechanism cavity. The input pinion has a stem, which is received in the pinion bore, and a pinion gear that is disposed in the differential mechanism cavity. The tail bearing is received in the pinion bore and supports the stem for rotation relative to the carrier housing. The head bearing is received in the pinion bore and supports the stem for rotation relative to the carrier housing. The head bearing is disposed between the tail bearing and the pinion gear. The differential mechanism is received in the cavity in the carrier housing. The ring gear is coupled to the differential mechanism. The ring gear is received in the differential mechanism cavity and meshed with the pinion gear. The cover pan assembly is sealingly coupled to the cover flange to close a side of the differential mechanism cavity opposite to the second body portion. The first and second axle tubes are received in the first and second axle tube bores and are fixedly coupled to the carrier housing. Therein the carrier housing further includes a pair of gussets and first and second sets of tail bearing support ribs. The gussets are disposed on opposite lateral sides of the second body portion and each gusset couples one of the tube mounts to the second body portion to resist bending of the one of the tube mounts toward the second body portion and vice-versa. The first set of tail bearing support ribs are disposed on the top side of the carrier housing and include first and second upper ribs that are disposed on opposite lateral side of the second body portion. Each of the first and second upper ribs extend perpendicularly from an associated one of the gussets and intersect the second body portion at an associated location that is configured to support the tail bearing. The second set of tail bearing support ribs are disposed on the bottom side of the carrier housing and including first and second lower ribs that are disposed on opposite lateral side of the second body portion. Each of the first and second lower ribs extend perpendicularly from an associated one of the gussets and terminate at the second body portion at a corresponding location that is configured to support the tail bearing.

In still another form, the present teachings provide an axle assembly that includes a carrier housing, an input pinion, a tail bearing, a head bearing, a differential mechanism, a ring gear, a cover pan assembly and first and second axle tubes. The carrier housing has a first body portion, a pair of hollow tube mounts, and a second body portion. The first body portion defines a differential mechanism cavity and a cover flange. The tube mounts extend from opposite lateral sides of the first body portion and are in fluid communication with the differential mechanism cavity. The second body portion extends from the first body portion on a side of the first body portion that is opposite the cover flange. A pinion bore is formed through the second body portion and intersects the differential mechanism cavity. The input pinion has a stem, which is received in the pinion bore, and a pinion gear that is disposed in the differential mechanism cavity. The tail bearing is received in the pinion bore and supports the stem for rotation relative to the carrier housing. The head bearing is received in the pinion bore and supports the stem for rotation relative to the carrier housing. The head bearing is disposed between the tail bearing and the pinion gear. The differential mechanism is received in the cavity in the carrier housing. The ring gear is coupled to the differential mechanism. The ring gear is received in the differential mechanism cavity and is meshed with the pinion gear. The cover pan assembly is sealingly coupled to the cover flange to close a side of the differential mechanism cavity opposite to the second body portion. The first and second axle tubes are received in the first and second axle tube bores and are fixedly coupled to the carrier housing. The carrier housing further includes a pair of gussets and a pair of head bearing support ribs. The gussets are disposed on opposite lateral sides of the second body portion. Each gusset couples one of the tube mounts to the second body portion to resist bending of the one of the tube mounts toward the second body portion and vice-versa. Each of the head bearing support ribs is coupled to a corresponding one of the gussets and the second body portion at a location that is configured to support the head bearing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
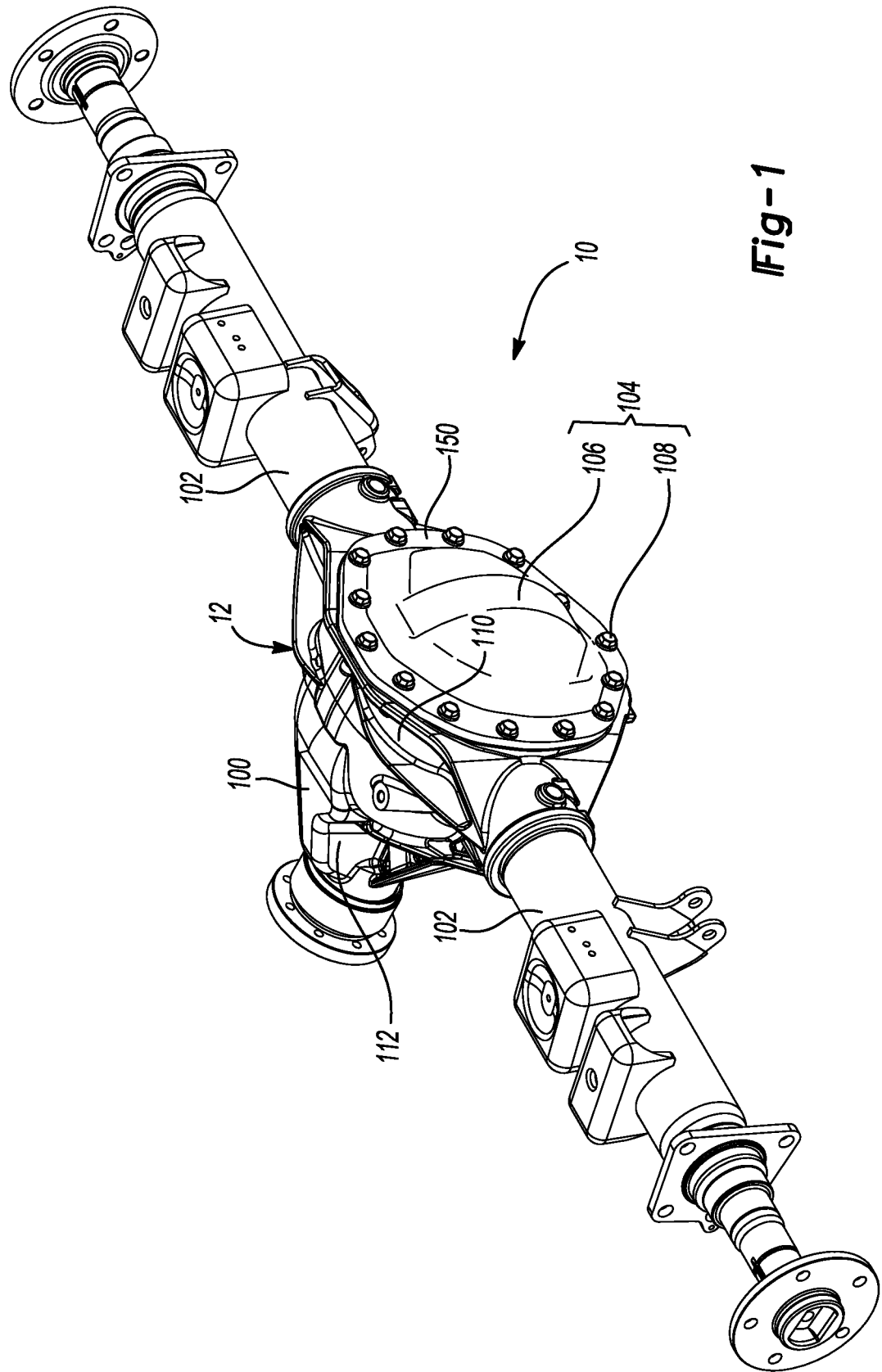
FIG. 1 is a perspective view of an axle assembly constructed in accordance with the teachings of the present disclosure.
Figure 2:
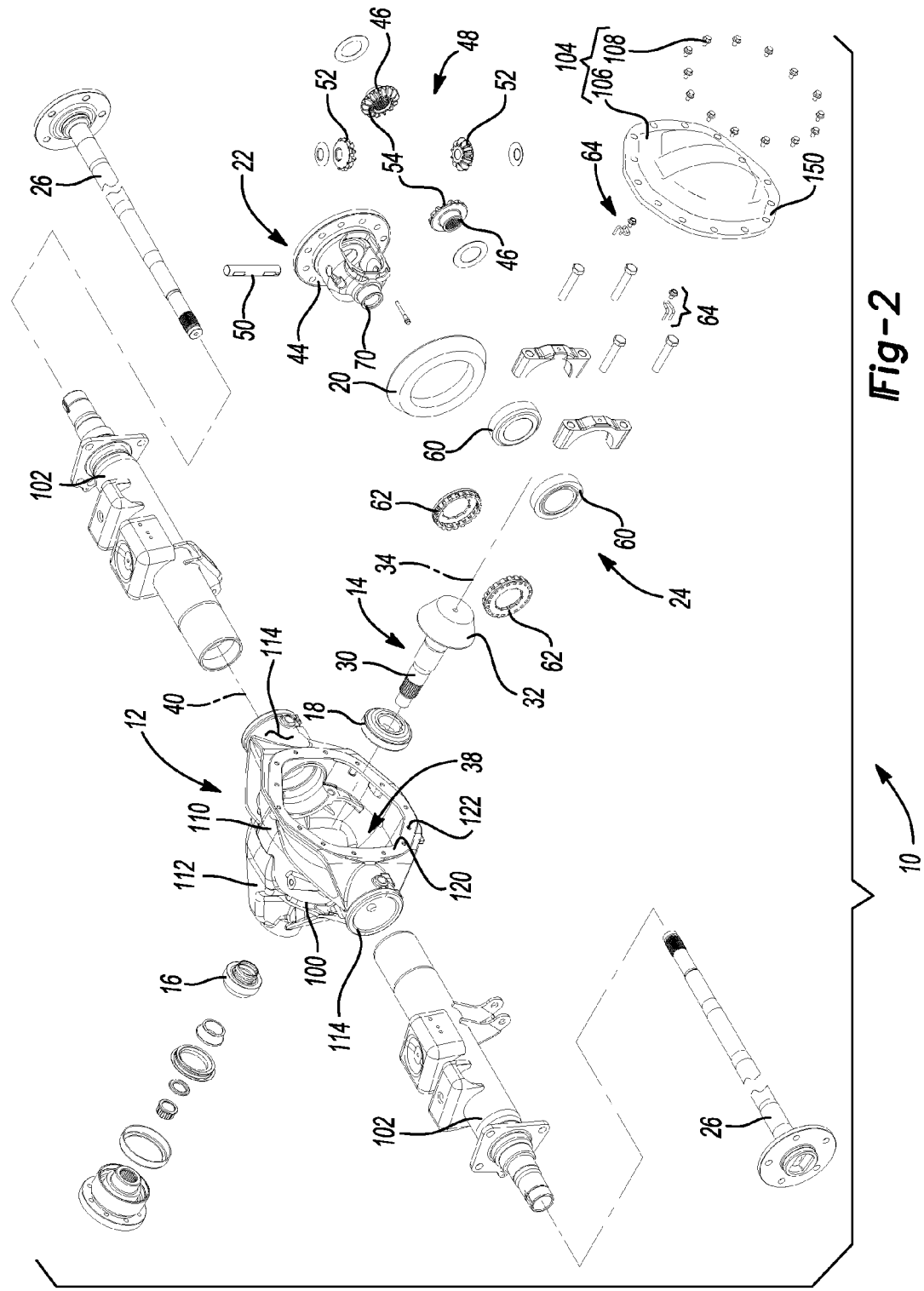
FIG. 2 is an exploded perspective view of the axle assembly of FIG. 1.

With reference to FIGS. 1 and 2 of the drawings, an exemplary axle assembly constructed in accordance with the teachings of the present disclosure is generally indicated by reference numeral 10. The axle assembly 10 is depicted as being configured for driving a pair of a rear vehicle wheels, but it will be appreciated that the present teachings have application to other types of axle assemblies, including axle assemblies that are configured for use in driving a pair of front vehicle wheels.

In FIG. 2, the axle assembly 10 can include an axle housing assembly 12, an input pinion 14, a tail bearing 16, a head bearing 18, a ring gear 20, a differential assembly 22, a differential bearing set 24, and a pair of output shafts 26. The input pinion 14, the tail bearing 16, the head bearing 18, the ring gear 20, the differential assembly 22, the differential bearing set 24 and the output shafts 26 can be constructed in a conventional and well known manner.

Figure 8:
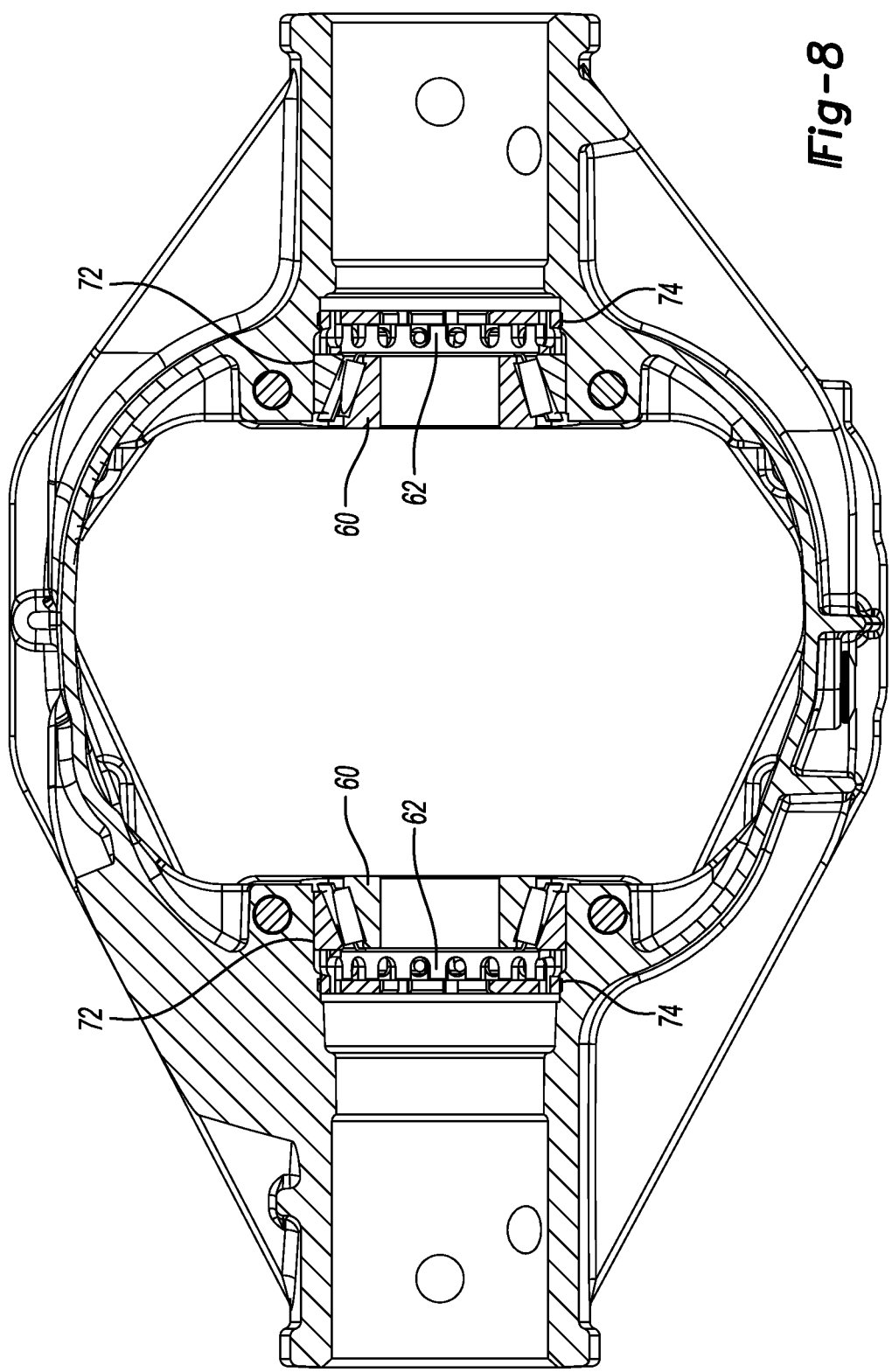
FIG. 8 is a section view taken along the line 8-8 of FIG. 4.

Briefly, the input pinion 14 can comprise a shaft 30, which is configured to be coupled to a propshaft assembly (not shown) to receive rotary power therefrom, and a pinion gear 32. The tail and head bearings 16 and 18 can be mounted on the shaft 30 and employed to support the input pinion 14 for rotation about a first axis 34 relative to the axle housing assembly 12. The tail and head bearings 16 and 18 can be any suitable type of bearing, such as tapered roller bearings. The ring gear 20 can be received in a differential mechanism cavity 38 in the axle housing assembly 12 and rotatably disposed about a second axis 40. The ring gear 20 can be meshingly engaged with the pinion gear 32. The differential assembly 22 can be received in the differential mechanism cavity 38 in the axle housing assembly 12 and can comprise a differential case 44, which can be coupled to the ring gear 20 for common rotation, a pair of differential output members 46, and a power transmitting means for transmitting rotary power between the differential case 44 and the differential output members 46. The power transmitting means can comprise clutches, gearing, etc., but in the particular example provided, includes a differential gearset 48 having a cross-pin 50, a pair of differential pinions 52, and a pair of side gears 54. The cross-pin 50 can extend generally perpendicular to the second axis 40 and can be coupled to the differential case 44 for common rotation about the second axis 40. The differential pinions 52 can be rotatably mounted on the cross-pin 50. Each of the side gears 54 can be coupled to an associated one of the differential output members 46 for common rotation about the second axis 40. Each side gear 54 can be meshingly engaged with the differential pinions 52. The differential bearing set 24 can be configured to support the differential assembly 22 for rotation about the second axis 40 relative to the axle housing assembly 12, as well as to handle any axial loads that result from the meshing of the pinion gear 32 with the ring gear 20. In the particular example provided, the differential bearing set 24 comprises a pair of differential bearings 60, a pair of bearing adjusters 62 and a set of bearing adjuster locks 64. Each of the differential bearings 60 can be a tapered roller bearing having an inner bearing race, which can be mounted to a trunnion 70 (only one shown) formed on the differential case 44, and an outer bearing race that can be received in a bore 72 (FIG. 8) in the axle housing assembly 12. Each of the bearing adjusters 62 can be threadably engaged to a threaded bore 74 (FIG. 8) in the axle housing assembly 12. Each bearing adjuster 62 can be disposed in the threaded bore 74 (FIG. 8) in the axle housing assembly 12 and can be configured to abut the outer bearing race of one of the differential bearings 60. Each of the output shafts 26 can be received through the axle housing assembly 12 and can engage one of the differential output members 46 such that rotation of the differential output members 46 causes corresponding rotation of the output shafts 26.

The axle housing assembly 12 can comprise a carrier housing 100, a pair of axle tubes 102, and a cover pan assembly 104 that can comprise a cover pan 106 and a plurality of threaded fasteners 108. The carrier housing 100 can have a first body portion 110, a second body portion 112 and a pair of tube mounts 114.

Figure 3:
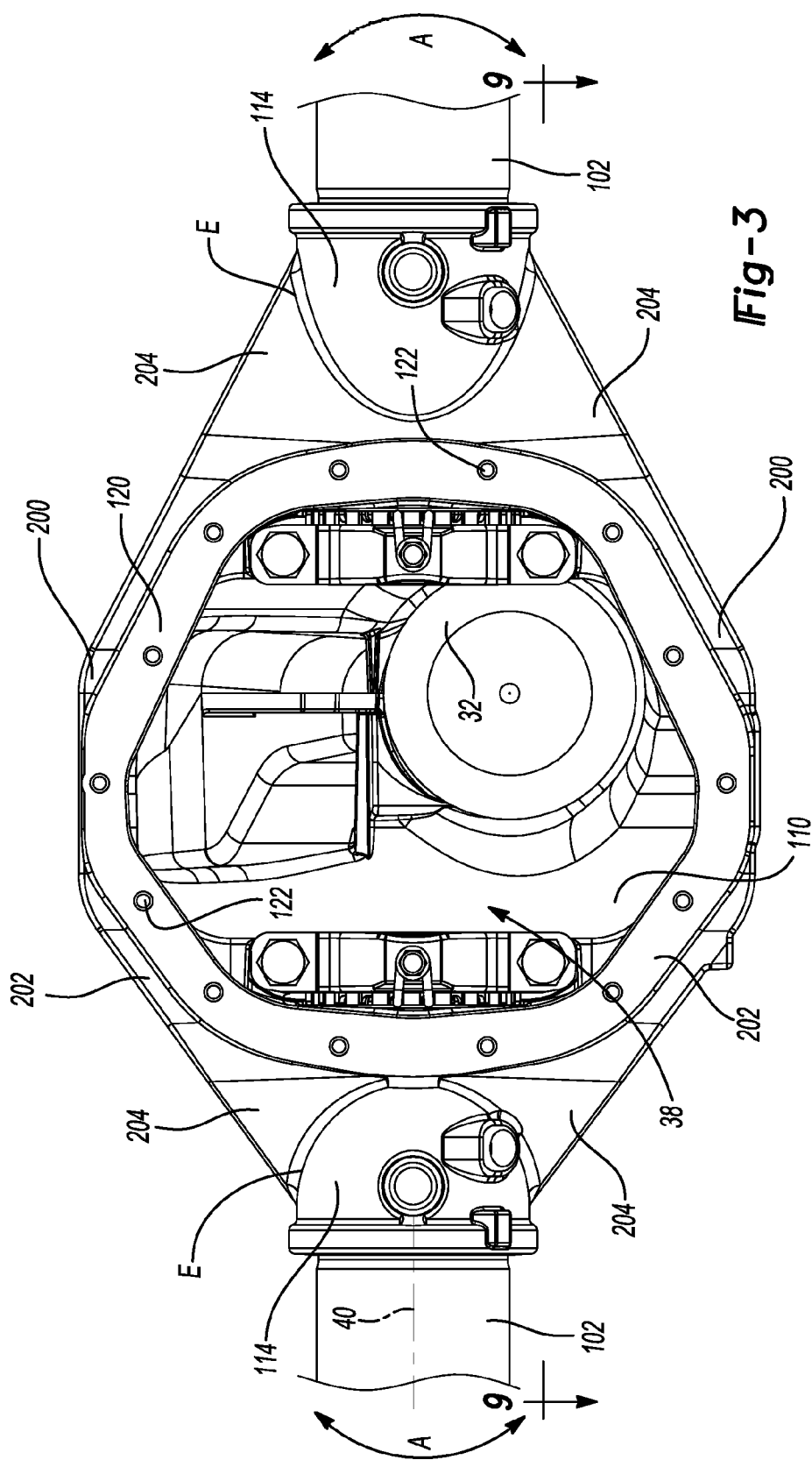
FIG. 3 is a rear elevation view of a portion of the axle assembly of FIG. 1 illustrating a portion of an axle housing assembly and an input pinion in more detail.
Figure 4:
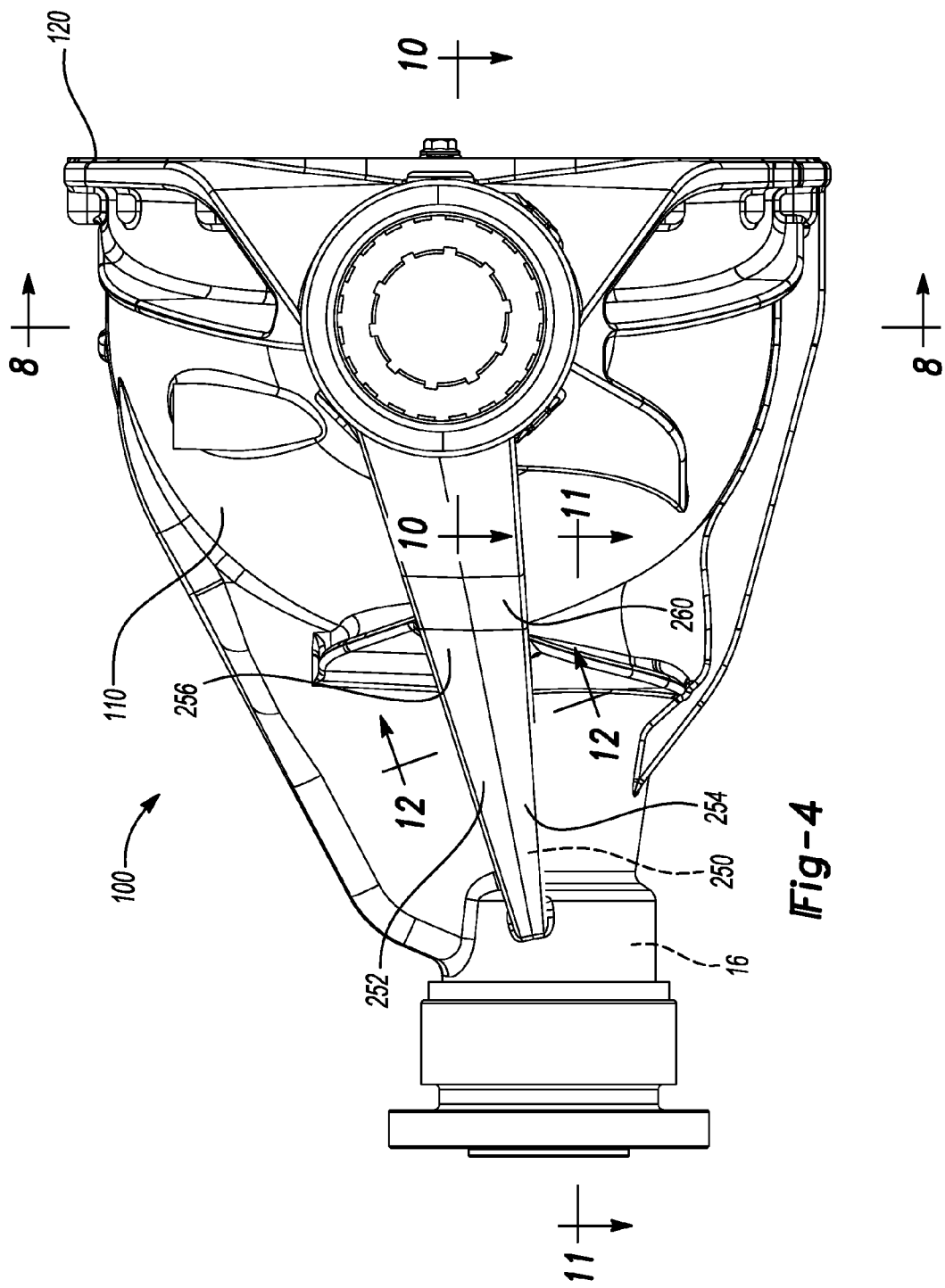
FIG. 4 is a right side elevation view of a portion of the axle assembly of FIG. 1, illustrating the axle housing assembly in more detail.
Figure 5:
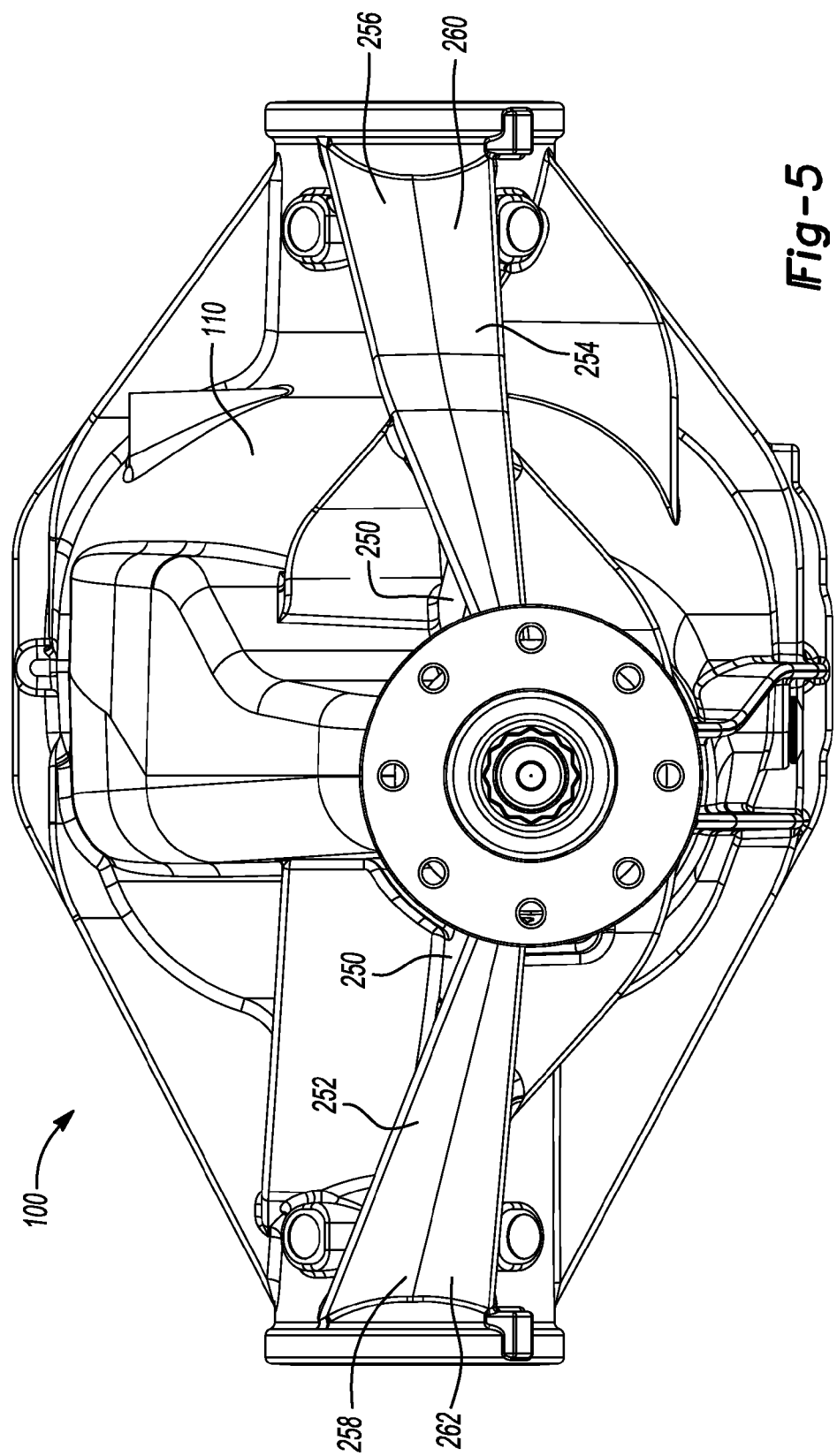
FIG. 5 is a front elevation view of a portion of the axle assembly of FIG. 1.
Figure 7:
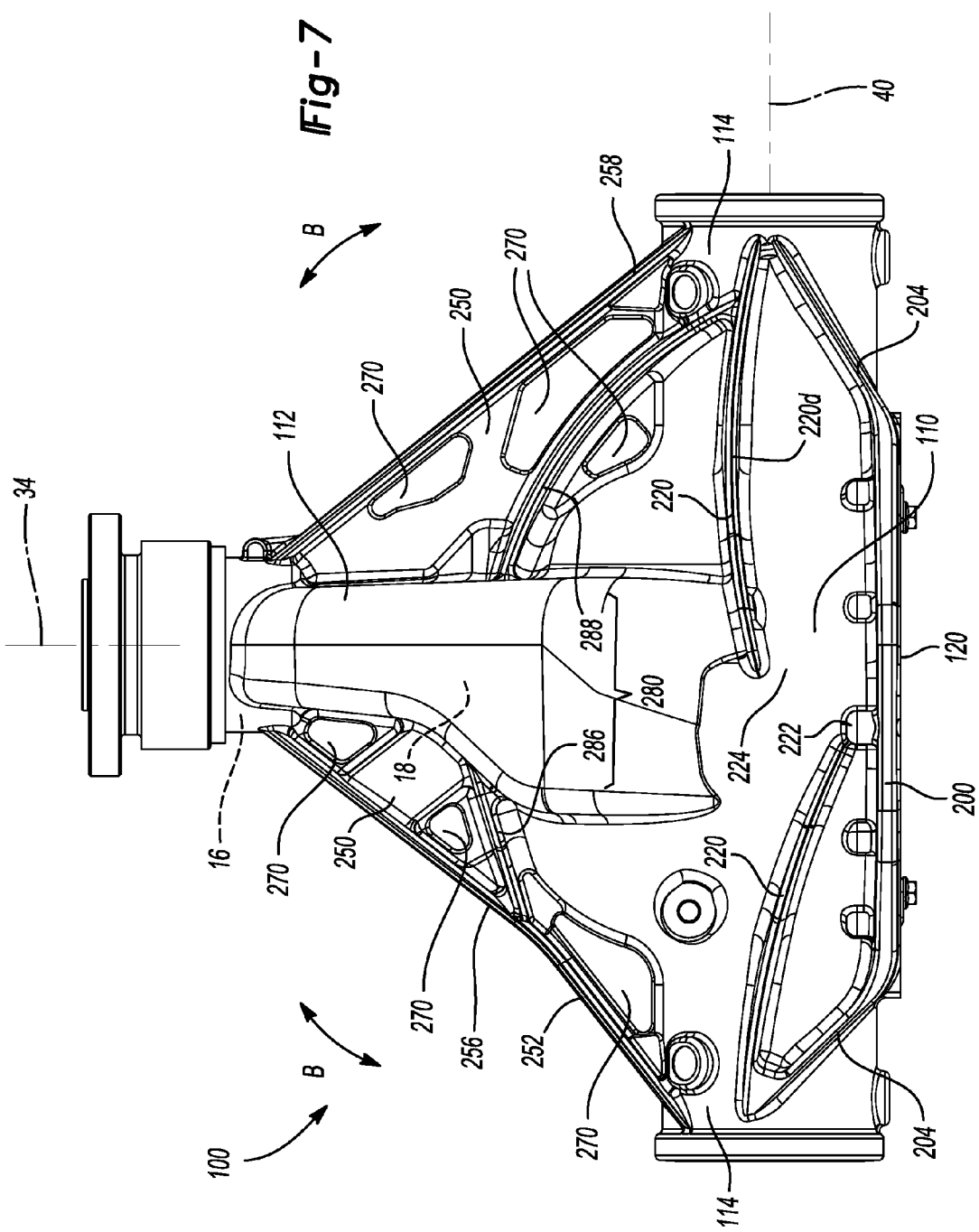
FIG. 7 is a top plan view of a portion of the axle assembly of FIG. 1, illustrating the carrier housing in more detail.

With reference to FIGS. 3, 4 and 7, the first body portion 110 can define the differential mechanism cavity 38 and a cover flange 120. The cover flange 120 can extend about an opening that provides access to the differential mechanism cavity 38, for example for installation of the differential assembly 22 (FIG. 2). A plurality of bolt holes 122 that are configured for receipt of the threaded fasteners 108 (FIG. 2) can be formed through the cover flange 120.

Figure 6:
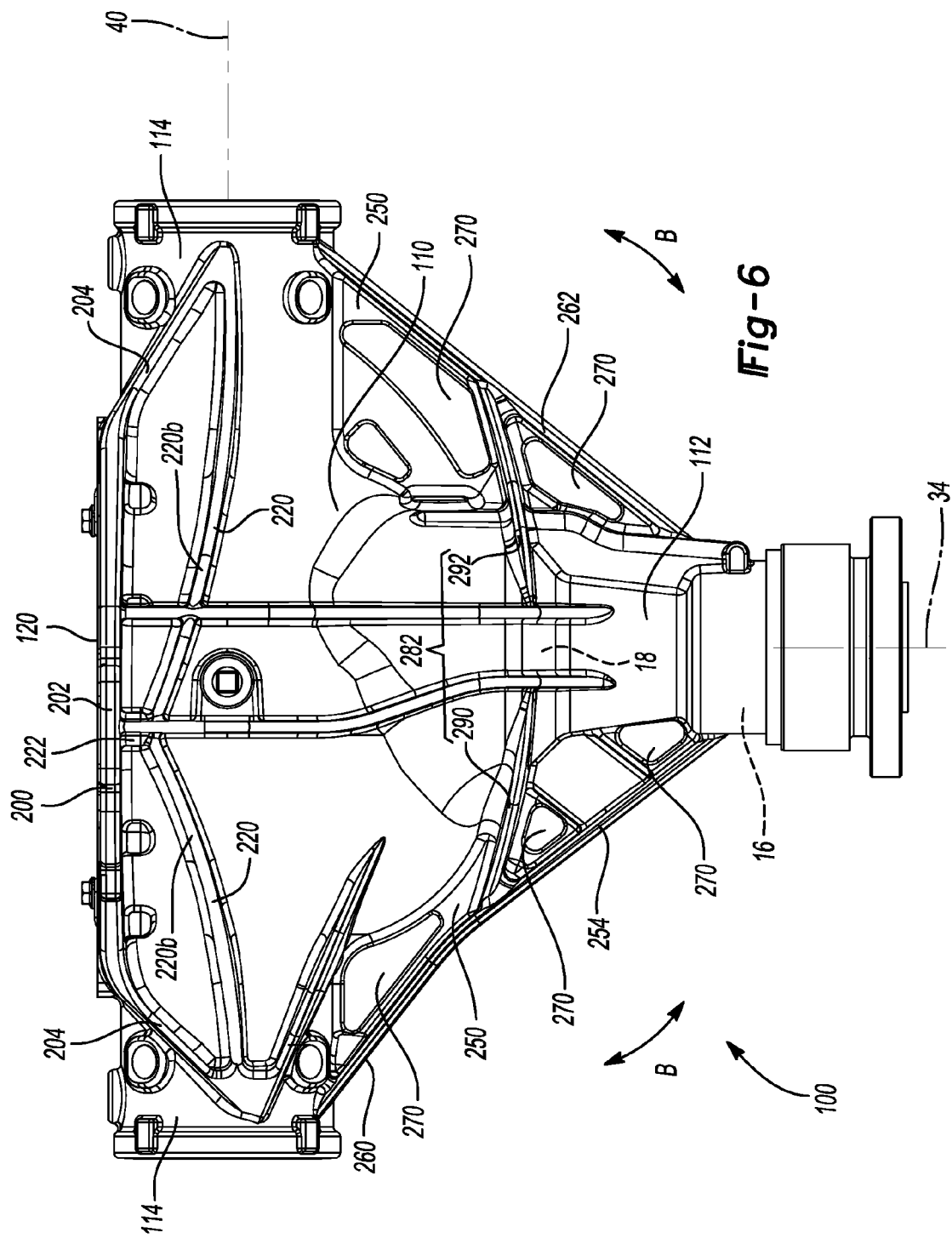
FIG. 6 is bottom plan view of a portion of the axle assembly of FIG. 1, illustrating the carrier housing in more detail.
Figure 9:
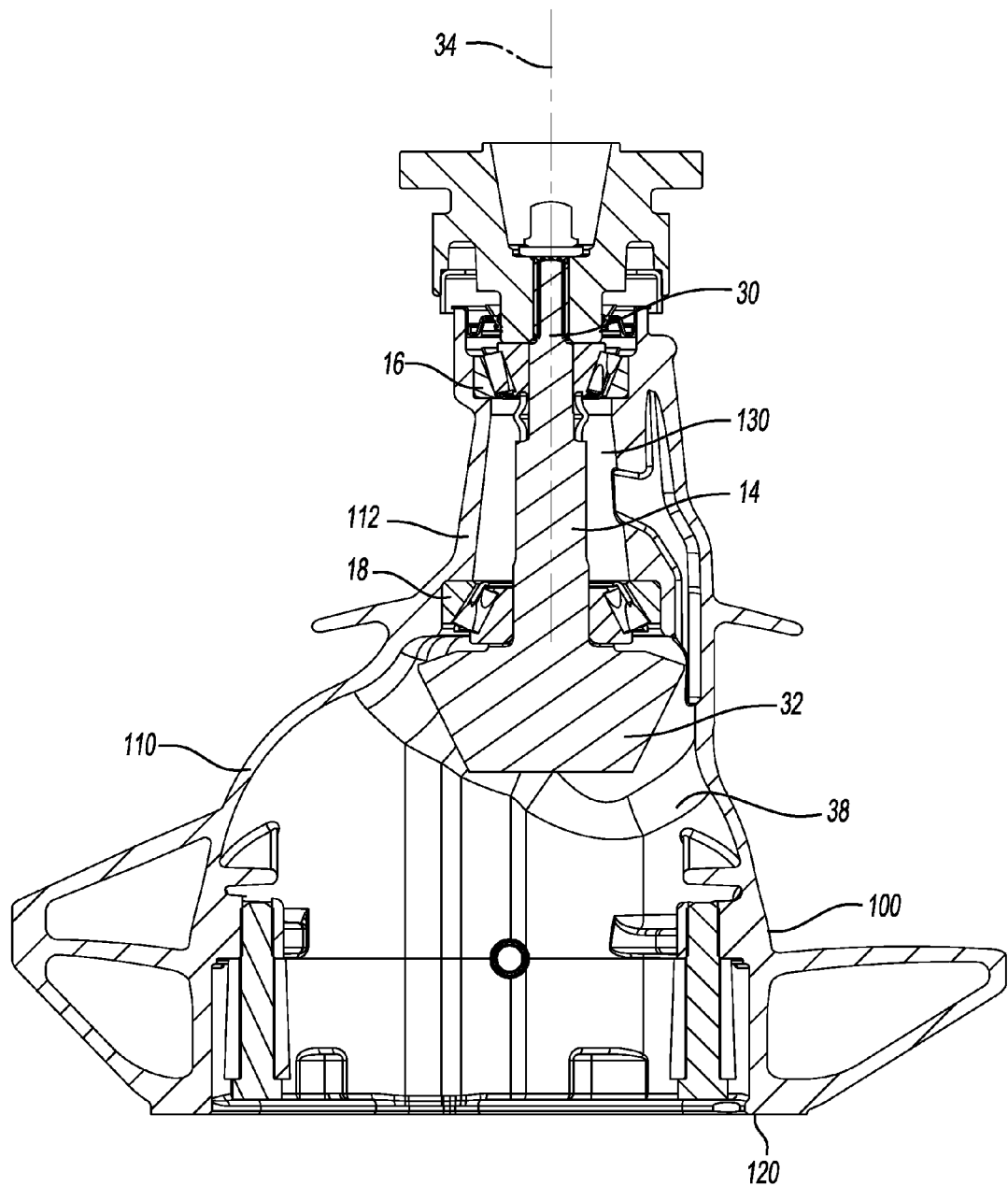
FIG. 9 is a section view taken along the line 9-9 of FIG. 3.

With reference to FIGS. 6 and 9, the second body portion 112 can be unitarily and integrally formed with the first body portion 110 and can extend from a side of the first body portion 110 that is opposite the cover flange 120. A pinion bore 130 can be formed through the second body portion 112 and can intersect the differential mechanism cavity 38. The tail and head bearings 16 and 18 are shown to support the input pinion 14 for rotation about the first axis 34 relative to the carrier housing 100. The pinion gear 32 can be disposed within the differential mechanism cavity 38. The head bearing 18 can be disposed along the shaft 30 of the input pinion 14 such that the head bearing 18 is disposed between the tail bearing 16 and the pinion gear 32.

Figure 10:
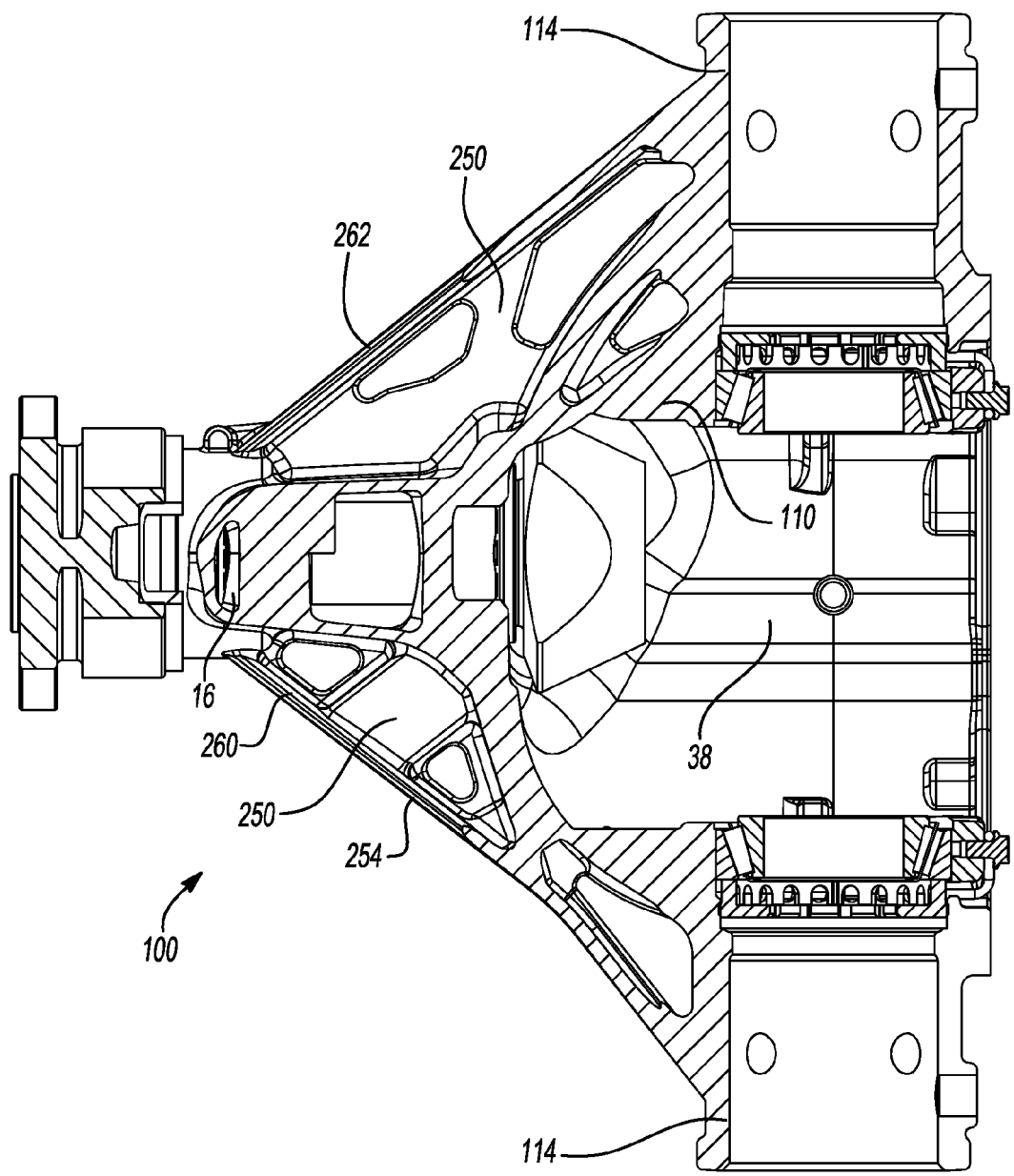
FIG. 10 is a section view taken along the line 10-10 of FIG. 4.

With reference to FIGS. 3, 6 and 10, the tube mounts 114 can extend from opposite lateral sides of the first body portion 110 and can be in fluid communication with the differential mechanism cavity 38. Each of the axle tubes 102 can be received in a corresponding one of the tube mounts 114 and can house an associated one of the output shafts 26 (FIG. 2).

Returning to FIG. 2, the cover pan assembly 104 is configured to close a side of the differential mechanism cavity 38 that is opposite the second body portion 112. The cover pan 106 can have a flange member 150 that is configured to cooperate with the cover flange 120 to seal the interface between the carrier housing 100 and the cover pan assembly 104. If desired, the cover pan assembly 104 can include a gasket or sealant material that can be disposed between the flange member 50 on the cover pan 106 and the cover flange 120. The threaded fasteners 108 can be received through the cover pan 106 and can threadably engage the bolt holes 122 formed in the cover flange 120.

With reference to FIGS. 3, 6 and 7, the carrier housing 100 can include a pair of strengthening ribs 200 that are located on the top side (FIG. 7) and the bottom side (FIG. 6) of the carrier housing 100. Each of the strengthening ribs 200 can have a first rib portion 202 and a pair of second rib portions 204. The first rib portion 202 can extend outwardly from the first body portion 110 and can at least partly define the cover flange 120. Each of the second rib portions 204 can extend from an associated end of the first rib portion 202 in a direction that is laterally outwardly from the first body portion 110 and forwardly toward the second body portion 112. Each second rib portion 204 can have a distal end portion that can terminate at an associated one of the tube mounts 114. In the example provided, the first rib portions 202 of the strengthening ribs 200 are configured to intersect one another and to fully define the cover flange 120, but it will be appreciated that the first rib portions 202 could be configured differently. The strengthening ribs 200 are configured to take advantage of the relative stiff portion of the first body portion 110 that defines the cover flange 120 and to provide additional support to the tube mounts 114 that helps to resist bending of the tube mounts 114 (relative to the first body portion 110) in vertical directions (indicated in FIG. 3 by arrow A).

The second rib portions 204 of each strengthening rib 200 can extend in an oblique manner relative to both an associated one of the tube mounts 114 and their first rib portion 202. The second rib portions 204 can terminate at any desired location on their associated tube mount 114, but in the example provided, the second rib portions 204 extend at least to a centerline of their associated tube mount 114 (in the example provided, the centerline of the tube mounts 114 are coincident with the second axis 40). As best shown in FIG. 3, the second rib portions 204 on each lateral side of the carrier housing 100 can intersect an associated one of the tube mounts 114 along a path that is defined by a portion of an elipse E. The second rib portions 204 of a given strengthening rib 200 need not be formed in an identical manner. For example, the second rib portions 204 on a first lateral side of the carrier housing 100 can be formed differently than the second rib portions 204 on a second, opposite lateral side of the carrier housing 100 as is shown in FIGS. 6 and 7.

With reference to FIGS. 6 and 7, the carrier housing 100 can further comprise a plurality of intermediate ribs 220 that can extend between one of the tube mounts 114 and the first body portion 110. The intermediate ribs 220 can provide additional help to resist bending of the tube mounts 114 relative to the first body portion 110 in vertical directions (indicated in FIG. 3 by arrow A). Each intermediate rib 220 can have a distal end portion that can terminate at an associated one of the second rib portions 204. In the particular example provided, the distal end portion of each intermediate rib 220 can terminate at the distal end portion of the associated one of the second rib portions 204 and can be disposed at or proximate a centerline of an associated one of the tube mounts 114. Each of the intermediate ribs 220 can extend from its distal end inwardly (toward the center of the first body portion 110) and rearwardly toward an associated one of the strengthening ribs 200. It will be appreciated the laterally inner end of each intermediate rib 220 can terminate at the associated one of the strengthening ribs 200; at a boss 222 associated with one of the bolt holes 122 (FIG. 3), as is depicted by the laterally inward end of the intermediate ribs 220*b* (FIG. 6) and 220*c* (FIG. 7); or at a portion 224 of the first body portion 110 that is configured to transmit load between the latterly inward end of the intermediate rib 220*d* (FIG. 7) and the strengthening rib 200. Accordingly, it will be appreciated that each of the intermediate ribs 220 can be shaped differently from the other intermediate ribs 220 to reduce or minimize the mass of the carrier housing 100 and consequently, the intermediate ribs 220 need not be symmetric about a plane that includes the first axis 34 and intersects the second axis 40.

With reference to FIGS. 4-7, 9, 10 and 12, the carrier housing 100 can further include a pair of gussets 250 and first and second sets of tail bearing support ribs 252 and 254, respectively. The gussets 250 can be disposed on opposite lateral sides of the second body portion 112 and each gusset 250 can couple one of the tube mounts 114 to the second body portion 112 to resist bending of the tube mounts 114 along arrow B (FIGS. 6 and 7) toward the second body portion 112 and vice-versa. The gussets 250, however, do not significantly aid in resisting bending in the direction of arrow A (FIG. 3) or twisting of the carrier housing 100 due to loads generated by the meshing of the input pinion 32 (FIG. 2) with the ring gear 20 (FIG. 2). The first and second sets of tail bearing support ribs 252 and 254 do, however, significantly aid in resisting bending in the direction of arrow A (FIG. 3) and the twisting of the carrier housing 100 due to loads generated by the meshing of the input pinion 32 (FIG. 2) with the ring gear 20 (FIG. 2).

The first set of tail bearing support ribs 252 can be disposed on the top side of the carrier housing 100 and can include first and second upper ribs 256 and 258, respectively, that are disposed on opposite lateral side of the second body portion 112. Each of the first and second upper ribs 256 and 258 can extend perpendicularly from an associated one of the gussets 250 and can intersect the second body portion 112 at an associated location that is configured to support the tail bearing 16. The first and second upper ribs 256 and 258 can taper outwardly from the gussets 250 in a manner that increases with increasing distance away from the tail bearing 16. The second upper rib 258 can be formed about a centerline that extends between one of the tube mounts 114 and the second body portion 112 and the centerline of the second upper rib 258 can be disposed in a plane that intersects the first and second axes 38 and 40. The first upper rib 256 can be formed about a centerline that is not contained in a single plane that intersects the first and second axes 38 and 40. In the particular example provided, the centerline of the first upper rib 256 is defined by two intersecting planes, each of which intersects the first and second axes 38 and 40. The second set of tail bearing support ribs 254 can be disposed on the bottom side of the carrier housing 100 and can include first and second lower ribs 260 and 262, respectively, that can be disposed on opposite lateral sides of the second body portion 112. Each of the first and second lower ribs 260 and 262 can extend perpendicularly from an associated one of the gussets 250 and can terminate at the second body portion 112 at a corresponding location that is configured to support the tail bearing 16. The first and second lower ribs 260 and 262 can taper outwardly from the gussets 250 in a manner that increases with decreasing distance from the tube mounts 114. If desired, the first upper and lower ribs 256 and 260 can intersect one another, and/or the second upper and lower ribs 258 and 262 can intersect one another. To further reduce the mass of the carrier housing 100, one or more lightening holes can be formed in the gussets 250.

In FIGS. 6 and 7, one or more intermediate ribs can extend between an associated one of the tube mounts 114 and the second body portion 112 to support the head bearing 18 and to resist bending of the tube mount 114 in a direction toward the second body portion 112 along arrow B (e.g., due to the weight of a vehicle), and to resist twisting of the carrier housing 100 as a result of the forces exerted on the carrier housing 100 that are associated with the meshing of the input pinion 14 (FIG. 2) and the ring gear 20 (FIG. 2).

With specific reference to FIG. 7, upper and lower sets of intermediate ribs 280 and 282, respectively are employed in the particular example provided. The upper set of intermediate ribs 280 can comprise a first upper intermediate rib 286 and a second upper intermediate rib 288 that can be disposed on opposite lateral sides of the carrier housing 100. The first and second upper intermediate ribs 286 and 288 can be curved or angled as desired and can extend directly between the second body portion 112 and an associated one of the tube mounts 114 in the manner that is depicted for the second upper intermediate rib 288, or could connect the second body portion 112 to a corresponding one of the tube mounts 114 as part of a system of ribs. The first upper intermediate rib 286 can have a first end, which can intersect the first upper rib 256, and can extend laterally inwardly and forwardly toward a second end that terminates at the second body portion 112 in an area proximate the head bearing 18. Accordingly, the first upper intermediate rib 286 and the first upper rib 256 cooperate to form a system of ribs that resist bending of a corresponding one of the tube mounts 114 along arrow B toward/away from the second body portion 112 and provide additional support to the portion of the second body portion 112 that houses the head bearing 18. It will be appreciated that if the first housing portion 110 were to be shaped somewhat differently or if additional packaging space were to be available, the first upper intermediate rib 286 could be formed so as to extend fully between the second housing portion 112 and the corresponding one of the tube mounts 114. The second upper intermediate rib 288 can have a first end, which can intersect a corresponding one of the tube mounts 114, and a second end that can intersect the second body portion 112 at a location proximate the head bearing 18. As such, the second upper intermediate rib 288 is a single rib that resists bending of a corresponding one of the tube mounts 114 along arrow B toward/away from the second body portion 112 and provides additional support to the portion of the second body portion 112 that houses the head bearing 18. The second upper intermediate rib 288 can be curved in shape so as to be fitted about the second body portion 112 and need not intersect the second upper rib 258. In the example provided, the second end of the second upper intermediate rib 288 also intersects a forward edge of the first body portion 110.

Figure 11:
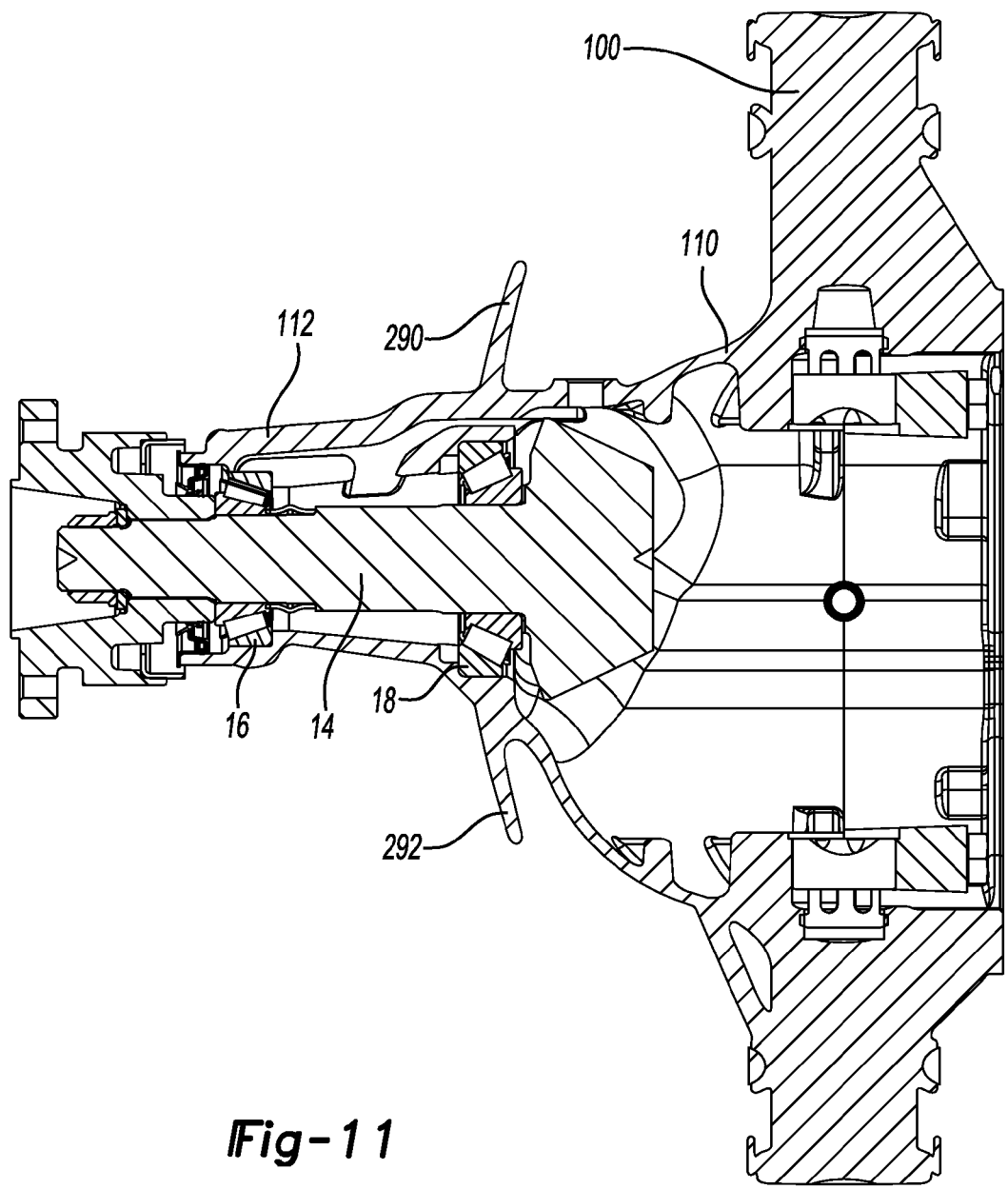
FIG. 11 is a section view taken along the line 11-11 of FIG. 4.
Figure 12:
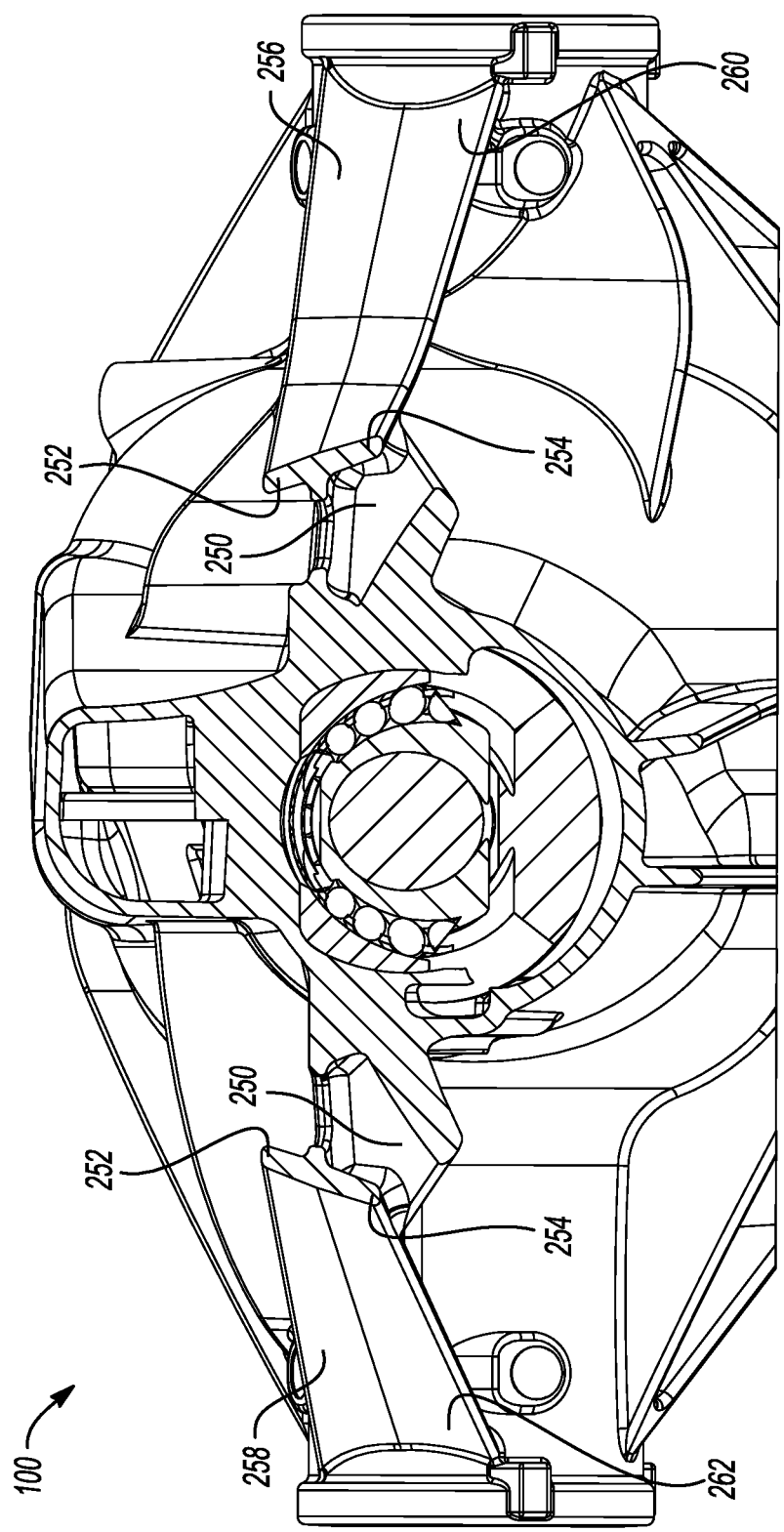
FIG. 12 is a section view taken along the line 12-12 of FIG. 4.

With reference to FIGS. 6 and 11, the lower set of intermediate ribs 282 are configured to connect (either directly or via a system of ribs) a corresponding one of the tube mounts 114 to a portion of the second body portion 112 that is proximate the head bearing 18 to thereby resist bending of the tube mounts in the direction of arrow B and to support the portion of the second housing portion 112 that houses the head bearing 18. The lower set of intermediate ribs 282 can comprise a first lower intermediate rib 290 and a second lower intermediate rib 292 that can be disposed on opposite lateral sides of the carrier housing 100. The first lower intermediate rib 290 can have a first end, which can intersect the first lower rib 260 and can extend laterally inwardly and forwardly toward a second end that terminates at the second body portion 112 in an area proximate the head bearing 18. Accordingly, the first lower intermediate rib 290 and the portion of the first lower rib 260 that is disposed between the tube mount 114 and the first lower intermediate rib 290 form a system of ribs that resist bending of the tube mount 114 along arrow B and support the portion of the second housing portion 112 that houses the head bearing 18. The second lower intermediate rib 292 can have a first end, which can intersect the second lower rib 262, and a second end that can intersect the second body portion 112 at a location proximate the head bearing 18. Accordingly, the second lower intermediate rib 292 and the portion of the second lower rib 266 that is disposed between the tube mount 114 and the second lower intermediate rib 292 form a system of ribs that resist bending of the tube mount 114 along arrow B and support the portion of the second housing portion 112 that houses the head bearing 18. Each of the first and second lower intermediate ribs 290 and 292 can project in a forward direction and may intersect a forward surface of the first body portion 110. In the particular example provided, the first and second lower intermediate ribs 290 and 292 are somewhat curved in shape. It will be appreciated that if the first housing portion 110 were to be shaped somewhat differently or if additional packaging space were to be available, the first lower intermediate rib 290 and/or the second lower intermediate rib 292 could be formed so as to extend fully between the second housing portion 112 and a corresponding one of the tube mounts 114.

Spatially relative terms, such as "top," "bottom," "upper," "lower," and the like, have been used herein for ease of description to describe one element or feature's relationship to another element(s) or feature(s) as illustrated in the figures. Spatially relative terms may be intended to encompass different orientations of the axle assembly in use or operation in addition to the orientation depicted in the figures. For example, if the axle assembly in the figures is turned over (as if the axle assembly were to be used to drive a pair of front vehicle wheels), elements described as a "bottom" surface or being "beneath" other elements or features would then be oriented as a "top" surface or being "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An axle assembly comprising:
    a carrier housing having a first body portion, a pair of hollow tube mounts, and a second body portion, the first body portion defining a differential mechanism cavity and a cover flange, the tube mounts extending from opposite lateral sides of the first body portion and being in fluid communication with the differential mechanism cavity, the second body portion extending from the first body portion on a side of the first body portion that is opposite the cover flange, a pinion bore being formed through the second body portion and intersecting the differential mechanism cavity;
    an input pinion having a stem and a pinion gear, the stem being received in the pinion bore, the pinion gear being disposed in the differential mechanism cavity;
    a differential mechanism received in the cavity in the carrier housing;
    a ring gear coupled to the differential mechanism, the ring gear being received in the differential mechanism cavity and meshed with the pinion gear;
    a cover pan assembly comprising a cover pan and a plurality of bolts that are received through the cover pan;
    first and second axle tubes received in the first and second axle tube bores and fixedly coupled to the carrier housing;
    wherein the carrier housing includes a pair of strengthening ribs that are located on top and bottom sides of the carrier housing, each of the strengthening ribs having a first rib portion, which extends outwardly from the first body portion and at least partly defines the cover flange, and a pair of second rib portions, each second rib portion having a first end, which directly extends from a corresponding end of an associated one of the first rib portions, and a second end that is located on an associated one of the tube mounts, an entirety of each second rib portion extending laterally outwardly and forwardly away from the cover flange with increasing distance from the first rib portion, wherein the cover flange is a planar mounting face against which the cover assembly is sealingly engaged and wherein a plurality of bolt holes are formed in the portions of the cover flange that are defined by the first rib portions, each of the bolt holes receiving a corresponding one of the bolts, the bolts securing the cover to the carrier housing.

2. The axle assembly of claim 1, wherein the second rib portions of each of the strengthening ribs extend in an oblique manner relative to the associated one of the tube mounts and the cover flange.

3. The axle assembly of claim 2, wherein the second rib portions on each lateral side of the carrier housing intersect the associated one of the tube mounts along a path that is defined by an ellipse.

4. The axle assembly of claim 1, wherein the first rib portions of the strengthening ribs intersect one another and cooperate to fully define the cover flange.

5. The axle assembly of claim 1, wherein the second rib portions of each of the strengthening ribs extend at least to a centerline of the associated one of the tube mounts.

6. The axle assembly of claim 1, wherein the carrier housing comprises a pair of intermediate ribs, each intermediate rib extending between one of the tube mounts and the first body portion, each intermediate rib terminating at a corresponding one of the second rib portions of the strengthening rib on the top side of the carrier housing.

7. The axle assembly of claim 6, wherein the second ends of the second rib portions intersect a corresponding one of the intermediate ribs.

8. The axle assembly of claim 6, wherein each of the intermediate ribs is shaped differently so that the intermediate ribs are not symmetric about a plane that includes the first axis and which is intersects the second axis.

9. The axle assembly of claim 1, wherein the second rib portions on a first lateral side of the carrier housing are formed differently than the second rib portions on a second, opposite lateral side of the carrier housing.

10. The axle assembly of claim 1, wherein the first portion of each of the strengthening ribs is shorter in a fore-aft direction that in a vertical direction.

11. The axle assembly of claim 1, wherein the strengthening ribs intersect one another.

12. The axle assembly of claim 11, wherein the first portions of the strengthening ribs completely define the cover flange.

13. An axle assembly comprising:
    a carrier housing having a first body portion, a pair of hollow tube mounts, and a second body portion, the first body portion defining a differential mechanism cavity and a cover flange, the tube mounts extending from opposite lateral sides of the first body portion and being in fluid communication with the differential mechanism cavity, the second body portion extending from the first body portion on a side of the first body portion that is opposite the cover flange, a pinion bore being formed through the second body portion and intersecting the differential mechanism cavity;

an input pinion having a stem and a pinion gear, the stem being received in the pinion bore, the pinion gear being disposed in the differential mechanism cavity;

a tail bearing received in the pinion bore and supporting the stem for rotation relative to the carrier housing;

a head bearing received in the pinion bore and supporting the stem for rotation relative to the carrier housing, the head bearing being disposed between the tail bearing and the pinion gear;

a differential mechanism received in the cavity in the carrier housing;

a ring gear coupled to the differential mechanism, the ring gear being received in the differential mechanism cavity and meshed with the pinion gear;

a cover pan assembly sealingly coupled to the cover flange to close a side of the differential mechanism cavity opposite to the second body portion;

first and second axle tubes received in the first and second axle tube bores and fixedly coupled to the carrier housing;

wherein the carrier housing further includes a pair of gussets and first and second sets of tail bearing support ribs, the gussets being disposed on opposite lateral sides of the second body portion, each gusset extending in a horizontal manner and coupling one of the tube mounts to the second body portion to resist bending of the one of the tube mounts toward the second body portion and vice-versa, the first set of tail bearing support ribs being disposed on the top side of the carrier housing and including first and second upper ribs that are disposed on opposite lateral side of the second body portion, each of the first and second upper ribs extending in a vertical manner from a laterally outboard side of an associated one of the gussets and intersecting the second body portion at an associated location that is configured to support the tail bearing, the second set of tail bearing support ribs being disposed on the bottom side of the carrier housing and including first and second lower ribs that are disposed on opposite lateral side of the second body portion, each of the first and second lower ribs extending in a vertical manner from a laterally outboard side of an associated one of the gussets and terminating at the second body portion at a corresponding location that is configured to support the tail bearing;

wherein the first and second upper ribs taper outwardly from the gussets in a manner that increases with increasing distance away from the tail bearing.

14. The axle assembly of claim 13, wherein the first and second lower ribs taper outwardly from the gussets in a manner that increases with decreasing distance toward the tube mounts.

15. The axle assembly of claim 13, wherein the first upper and lower ribs intersect one another.

16. The axle assembly of claim 13, wherein a least one lightening hole is formed in each of the gussets.

17. The axle assembly of claim 13, wherein the second upper rib is formed about a centerline that extends between one of the tube mounts and the second body portion, wherein the centerline is disposed in a plane that intersects a first axis, about which the input pinion rotates, and a second axis, about which the differential mechanism rotates.

18. The axle assembly of claim 13, wherein the first upper rib is formed about a centerline that is not contained in a single plane that intersects a first axis, about which the input pinion rotates, and a second axis, about which the differential mechanism rotates.

19. An axle assembly comprising:

a carrier housing having a first body portion, a pair of hollow tube mounts, and a second body portion, the first body portion defining a differential mechanism cavity and a cover flange, the tube mounts extending from opposite lateral sides of the first body portion and being in fluid communication with the differential mechanism cavity, the second body portion extending from the first body portion on a side of the first body portion that is opposite the cover flange, a pinion bore being formed through the second body portion and intersecting the differential mechanism cavity;

an input pinion having a stem and a pinion gear, the stem being received in the pinion bore, the pinion gear being disposed in the differential mechanism cavity;

a tail bearing received in the pinion bore and supporting the stem for rotation relative to the carrier housing;

a head bearing received in the pinion bore and supporting the stem for rotation relative to the carrier housing, the head bearing being disposed between the tail bearing and the pinion gear;

a differential mechanism received in the cavity in the carrier housing;

a ring gear coupled to the differential mechanism, the ring gear being received in the differential mechanism cavity and meshed with the pinion gear;

a cover pan assembly sealingly coupled to the cover flange to close a side of the differential mechanism cavity opposite to the second body portion;

first and second axle tubes received in the first and second axle tube bores and fixedly coupled to the carrier housing;

wherein the carrier housing further includes a pair of gussets and first and second sets of tail bearing support ribs, the gussets being disposed on opposite lateral sides of the second body portion, each gusset extending in a horizontal manner and coupling one of the tube mounts to the second body portion to resist bending of the one of the tube mounts toward the second body portion and vice-versa, the first set of tail bearing support ribs being disposed on the top side of the carrier housing and including first and second upper ribs that are disposed on opposite lateral side of the second body portion, each of the first and second upper ribs extending in a vertical manner from a laterally outboard side of an associated one of the gussets and intersecting the second body portion at an associated location that is configured to support the tail bearing, the second set of tail bearing support ribs being disposed on the bottom side of the carrier housing and including first and second lower ribs that are disposed on opposite lateral side of the second body portion, each of the first and second lower ribs extending in a vertical manner from a laterally outboard side of an associated one of the gussets and terminating at the second body portion at a corresponding location that is configured to support the tail bearing;

wherein the second upper rib is formed about a centerline that extends between one of the tube mounts and the second body portion, wherein the centerline is disposed in a plane that intersects a first axis, about which the input pinion rotates, and a second axis, about which the differential mechanism rotates.

20. The axle assembly of claim 19, wherein the first upper and lower ribs intersect one another.

21. The axle assembly of claim 19, wherein the first upper rib is formed about a centerline that is not contained in a single plane that intersects a first axis, about which the input pinion rotates, and a second axis, about which the differential mechanism rotates.

22. An axle assembly comprising:
a carrier housing having a first body portion, a pair of hollow tube mounts, and a second body portion, the first body portion defining a differential mechanism cavity and a cover flange, the tube mounts extending from opposite lateral sides of the first body portion and being in fluid communication with the differential mechanism cavity, the second body portion extending from the first body portion on a side of the first body portion that is opposite the cover flange, a pinion bore being formed through the second body portion and intersecting the differential mechanism cavity;
an input pinion having a stem and a pinion gear, the stem being received in the pinion bore, the pinion gear being disposed in the differential mechanism cavity;
a tail bearing received in the pinion bore and supporting the stem for rotation relative to the carrier housing;
a head bearing received in the pinion bore and supporting the stem for rotation relative to the carrier housing, the head bearing being disposed between the tail bearing and the pinion gear;
a differential mechanism received in the cavity in the carrier housing;
a ring gear coupled to the differential mechanism, the ring gear being received in the differential mechanism cavity and meshed with the pinion gear;
a cover pan assembly sealingly coupled to the cover flange to close a side of the differential mechanism cavity opposite to the second body portion;
first and second axle tubes received in the first and second axle tube bores and fixedly coupled to the carrier housing;
wherein the carrier housing further includes a pair of gussets and first and second sets of tail bearing support ribs, the gussets being disposed on opposite lateral sides of the second body portion, each gusset extending in a horizontal manner and coupling one of the tube mounts to the second body portion to resist bending of the one of the tube mounts toward the second body portion and vice-versa, the first set of tail bearing support ribs being disposed on the top side of the carrier housing and including first and second upper ribs that are disposed on opposite lateral side of the second body portion, each of the first and second upper ribs extending in a vertical manner from a laterally outboard side of an associated one of the gussets and intersecting the second body portion at an associated location that is configured to support the tail bearing, the second set of tail bearing support ribs being disposed on the bottom side of the carrier housing and including first and second lower ribs that are disposed on opposite lateral side of the second body portion, each of the first and second lower ribs extending in a vertical manner from a laterally outboard side of an associated one of the gussets and terminating at the second body portion at a corresponding location that is configured to support the tail bearing;
wherein the first upper rib is formed about a centerline that is not contained in a single plane that intersects a first axis, about which the input pinion rotates, and a second axis, about which the differential mechanism rotates.

23. The axle assembly of claim 22, wherein a first upper intermediate rib extends between the second body portion and the first upper rib and a second upper intermediate rib extends between the second body portion and the second upper rib, and wherein the first and second intermediate upper ribs connect to the second body portion in an area that supports the head bearing.

24. The axle assembly of claim 22, wherein a first lower intermediate rib extends between the second body portion and the first lower rib and a second lower intermediate rib extends between the second body portion and the second lower rib, and wherein the first and second intermediate lower ribs connect to the second body portion in an area that supports the head bearing.

25. The axle assembly of claim 22, wherein the first upper and lower ribs intersect one another.

26. An axle assembly comprising:
a carrier housing having a first body portion, a pair of hollow tube mounts, and a second body portion, the first body portion defining a differential mechanism cavity and a cover flange, the tube mounts extending from opposite lateral sides of the first body portion and being in fluid communication with the differential mechanism cavity, the second body portion extending from the first body portion on a side of the first body portion that is opposite the cover flange, a pinion bore being formed through the second body portion and intersecting the differential mechanism cavity;
an input pinion having a stem and a pinion gear, the stem being received in the pinion bore, the pinion gear being disposed in the differential mechanism cavity;
a tail bearing received in the pinion bore and supporting the stem for rotation relative to the carrier housing;
a head bearing received in the pinion bore and supporting the stem for rotation relative to the carrier housing, the head bearing being disposed between the tail bearing and the pinion gear;
a differential mechanism received in the cavity in the carrier housing;
a ring gear coupled to the differential mechanism, the ring gear being received in the differential mechanism cavity and meshed with the pinion gear;
a cover pan assembly sealingly coupled to the cover flange to close a side of the differential mechanism cavity opposite to the second body portion;
first and second axle tubes received in the first and second axle tube bores and fixedly coupled to the carrier housing;
wherein the carrier housing further includes a pair of gussets and a pair of first head bearing support ribs, the gussets being disposed on opposite lateral sides of the second body portion, each gusset extending in a horizontal manner and coupling one of the tube mounts to the second body portion to resist bending of the one of the tube mounts toward the second body portion and vice-versa, each of the first head bearing support ribs being directly coupled to and extending in a vertical manner from a corresponding one of the gussets, each of the first head bearing support ribs terminating at the second body portion at a first location that is configured to support the head bearing.

27. The axle assembly of claim 26, wherein the carrier housing further includes a pair of second head bearing support ribs, the second head bearing support ribs being coupled to a side of the gussets that is opposite a side to which the first head bearing support ribs are coupled, the second head bearing support ribs being coupled the second body portion at a second location that is configured to support the head bearing.

28. An axle assembly comprising:
a carrier housing having a first body portion, a pair of hollow tube mounts, and a second body portion, the first body portion defining a differential mechanism cavity and a cover flange, the cover flange defining a plurality of bolt holes, the tube mounts extending from opposite lateral sides of the first body portion and being in fluid communication with the differential mechanism cavity, the second body portion extending from the first body portion on a side of the first body portion that is opposite the cover flange, a pinion bore being formed through the second body portion and intersecting the differential mechanism cavity;
an input pinion having a stem and a pinion gear, the stem being received in the pinion bore, the pinion gear being disposed in the differential mechanism cavity;
a differential mechanism received in the cavity in the carrier housing;
a ring gear coupled to the differential mechanism, the ring gear being received in the differential mechanism cavity and meshed with the pinion gear;
a cover pan assembly sealingly coupled to the cover flange to close a side of the differential mechanism cavity opposite to the second body portion, the cover pan assembly comprising a cover pan and a plurality of bolts that are received through the cover pan and threadably engaged to the bolt holes in the cover flange;
first and second axle tubes received in the first and second axle tube bores and fixedly coupled to the carrier housing;
wherein the carrier housing includes a pair of strengthening ribs, a pair of gussets, first and second sets of tail bearing support ribs, and first and second sets of head bearing support ribs,
the strengthening ribs being located on top and bottom sides of the carrier housing, each of the strengthening ribs having a first rib portion, which extends outwardly from the first body portion and at least partly defines the cover flange, and a pair of second rib portions, each second rib portion extending from an end of the first rib portion and extending laterally outwardly and forwardly toward the second body portion, each second rib portion terminating at an associated one of the tube mounts, the gussets being disposed on opposite lateral sides of the second body portion, each gusset extending in a horizontal manner and coupling one of the tube mounts to the second body portion to resist bending of the one of the tube mounts toward the second body portion and vice-versa, the first set of tail bearing support ribs being disposed on the top side of the carrier housing and including first and second upper ribs that are disposed on opposite lateral sides of the second body portion, each of the first and second upper ribs extending in a vertical manner from a laterally outboard side of an associated one of the gussets and intersecting the second body portion at an associated location that is configured to support the tail bearing, the second set of tail bearing support ribs being disposed on the bottom side of the carrier housing and including first and second lower ribs that are disposed on opposite lateral in a vertical manner from a laterally outboard side of an associated one of the gussets and terminating at the second body portion at a corresponding location that is configured to support the tail bearing, the first set of head bearing support ribs being disposed on the top side of the carrier housing and including first and second upper head bearing support ribs that are disposed on opposite lateral sides of the second body portion, each of the first and second upper head bearing support ribs being coupled to a corresponding one of the gussets and to the second body portion to support the head bearing, the second set of head bearing support ribs being disposed on the bottom side of the carrier housing and including first and second lower head bearing support ribs that are disposed on opposite lateral sides of the second body portion, each of the first and second lower bearing support ribs being coupled to an associated one of the gussets and to the second body portion to support the head bearing.

* * * * *